Aug. 22, 1950 M. HANDSCHIN 2,519,568

METHOD OF OPERATING TELEPHONOGRAPHS

Filed Feb. 27, 1948 3 Sheets-Sheet 1

Inventor
Max Handschin
By Singer, Ehlert, Stern & Carlberg
attys.

Aug. 22, 1950 M. HANDSCHIN 2,519,568

METHOD OF OPERATING TELEPHONOGRAPHS

Filed Feb. 27, 1948 3 Sheets-Sheet 2

Inventor
Max Handschin
By Singer, Ehlert, Stern &
Carlberg, Attys

Aug. 22, 1950 M. HANDSCHIN 2,519,568

METHOD OF OPERATING TELEPHONOGRAPHS

Filed Feb. 27, 1948 3 Sheets-Sheet 3

Inventor
Max Handschin
By Singer, Ehlert, Stern & Carlberg
attys

Patented Aug. 22, 1950 2,519,568

UNITED STATES PATENT OFFICE 2,519,568

METHOD OF OPERATING TELEPHONOGRAPHS

Max Handschin, Kusnacht, Switzerland, assignor to Daphne Investment Trust, Vaduz, Liechtenstein Application February 27, 1948, Serial No. 11,818
In Switzerland August 9, 1947

9 Claims. (Cl. 179—6)

The present invention relates to a telephonograph with replying device.

In the telephonographs which have become hitherto known, buzzer and "engaged" signals have been used, in order to communicate certain messages to the calling subscriber or to indicate certain conditions of the telephonograph to him. This was effected for example when indicating that a certain reproduction had been terminated, that the priming was made the wrong way etc. This kind of giving signals by buzzer or "engaged" signals however often missed its object, since the various signs caused confusion to a layman calling who was not well acquainted with the device.

This disadvantage is overcome according to the invention thereby that all indications as to the function, position, condition of the telephonograph, and orders are spoken to the calling subscriber with a clear wording so that they are well understood even by any layman or beginner in the use of a telephonograph without any further explanation.

If for example the telephonograph is correctly primed by means of a vowel, the correct excitation is for example confirmed to the calling subscriber by having the words "Priming is correct" addressed to him. If however, the priming is effected, conversely, in a wrong way, the calling subscriber is informed accordingly, for example by the words "Priming is wrong." The same applies to further messages. After the termination of the reproduction for example the calling subscriber is informed by a clear wording, that the reproduction has been terminated and that an order for effacing can now be given. If then such an order for effacing is given, for example in a known way by means of a vowel, the calling subscriber is for example addressed with the words "telephonograph has been cleared." If however no order for effacing is forthcoming the calling subscriber is positively warned e. g. with the words "telephonograph not yet cleared."

The wording of the text communicated can of course be chosen as the case may be according to requirements. However it is essential, that the calling subscriber does no longer receive the various messages and communications in a, so to say, coded manner, but in a generally understandable open wording.

Figure 1:
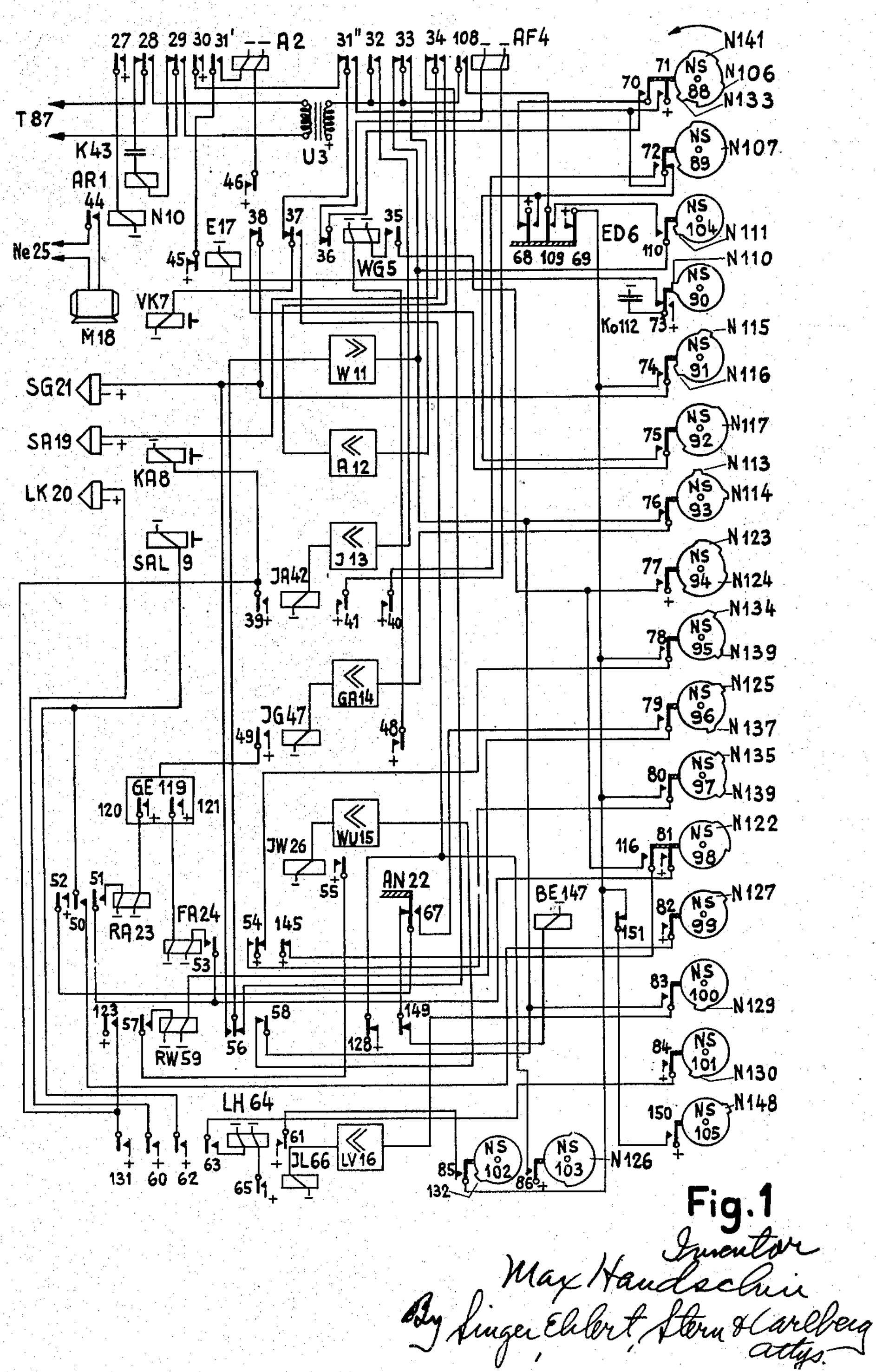
Figure 2:
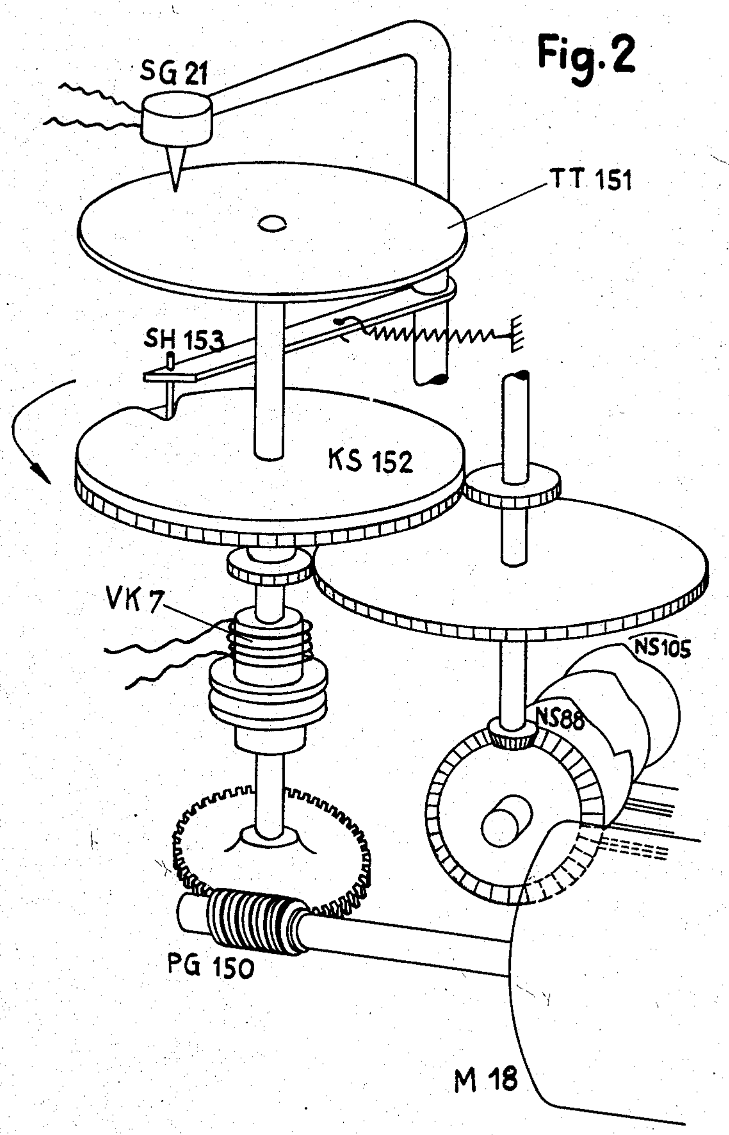

In the accompanying drawing Fig. 1 a circuit diagram for performing the idea of the invention has been shown by way of example. For the purpose of better understanding Fig. 2 shows schematically an embodiment of the mechanical construction of the replying device. The mechanical construction of the recording- and reproducing device is shown with the aid of a schematically represented embodiment in Fig. 3.

Only those components of the telephonograph which are important for the understanding of the invention are shown. The contacts operated by the cores of the individual relays are respectively drawn in axial alignment therewith.

The "minus"- and "plus"- signs in the drawing denote the "minus"- or "plus"-pole of the current source supplying the relays and clutches. In the following specification of the device, the "plus"-pole of the source of current is always referred to as "earth" and the "minus"-pole as "minus."

For a first embodiment be it assumed that the calling subscriber T87 would like to talk into the telephonograph over a long distance line. It is well known to make the calling subscriber hear one invitation to talk delivered by the telephonograph or the replying device thereof after the general address. However it has been found to be a disadvantage of the practice hitherto used that the calling subscriber, in our example the subscriber T87 may miss this invitation to talk, or that the case of long distant connections the line between the calling subscriber and the telephonograph can not be put through quickly enough. In these cases the calling subscriber does not hear the announcement or the invitation to talk. These disadvantages are overcome here according to the invention thereby that the calling subscriber is addressed for example about 8 seconds later by a second announcement or invitation to talk.

By the calling current the relay AR1 is energized in a known way by the circuit:

(1) Subscriber T87, contact 28, condenser K43, relay AR1, contact 29, subscriber T87.

By the relay AR1, the relay A2, too, is energized that connects the subscriber-loop with the transformer U3. Moreover the relay N10 is energized, that starts the motor M18. Likewise the electromagnetic clutch VK7 is energized.

Relay A2 is energized by the circuit:

(2) Earth, contact 46, relay A2, pulling coil, minus. Relay N10 is energized by the circuit:

(3) Earth, contact 27, relay N10, minus. The motor M18 is connected with the mains Ne25 by the circuit:

(4) Mains Ne25, contact 44, motor M18, mains Ne25. Relay A2 is held by the circuit.

(5) Earth, contact 45, contact 34', relay A2 holding coil, minus.

The circuits 1 and 2 become disenergized. The forward-clutch VK7 is energized by closing the contact 30, by the circuit:

(6) Earth, contact 30, contact 31'', contact 37, clutch VK7, minus.

Now the sound carrier TT151 (Fig. 2) and with it the cam disc KS152 (Fig. 2) which is strongly geared down, and the cam discs NS88 to NS105 (Figs. 1 and 2) are set in motion in the direction of the arrow by the reduction gear PG150 (Fig. 2), which might also be a planet gear. The subscriber T87 hears in a known way the text, recorded on the sound carrier TT151, of the replying device by the circuit:

(7) Subscriber T87, contact 28, transformer U3, contact 29, subscriber T87.

After the transformer there is consequently the circuit:

(8) Earth, transformer U3, contact 33, reproduction amplifier W11, contact 56, pick-up SG21, earth.

After the subscriber T87 received the invitation to talk, the cam disc NS88 (as well as all the others) has been set in motion in the direction of the arrow, and the cam N141 closes the two contacts 70 and 71; thereby the relay AF4 is energized by the circuit.

(9) Earth, contact 68 (end-switch ED6), contact 70, contact 36, relay AF4 (first operating coil) minus.

Figure 3:
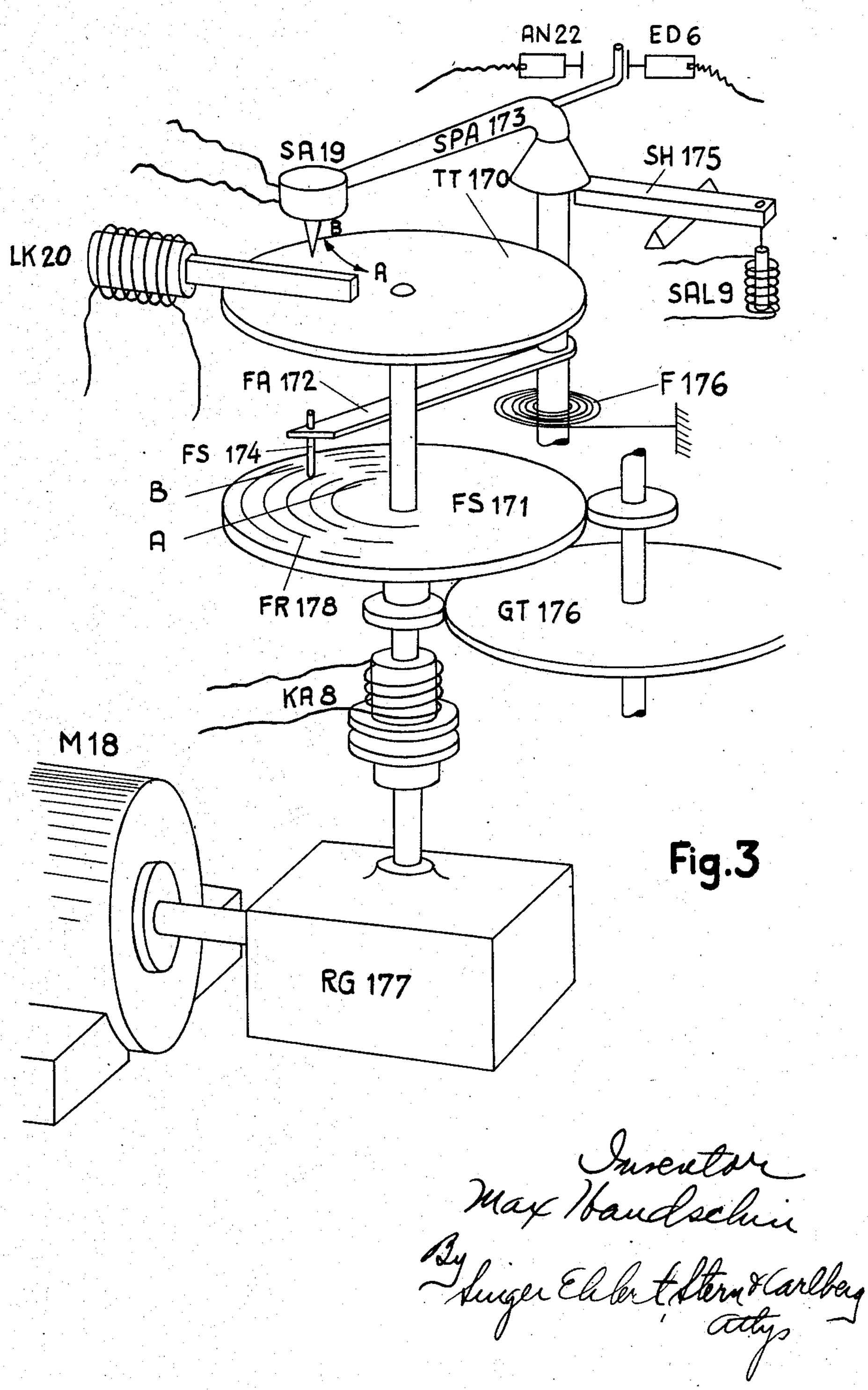

By the energizing of relay AF4 the transformer line (circuit 8) is switched over from the reproduction amplifier W11 to the reception amplifier A12 and the parallel impulse supervising amplifier J13. Therefrom results for the reception amplifier A12 the following circuit:

(10) Earth, transformer U3, contact 33, amplifier A12, contact 34, pick-up SA19, earth. For the impulse amplifier J13 results the circuit:

(11) Earth, transformer U3, contact 32, impulse amplifier J13, relay JA42, minus. Circuits 10 and 11, as long as subscriber T84 does not send any speech impulses, are merely primed, i. e. relay JA42 only becomes energized when speech impulses are being transmitted for recording on the sound carrier TT170 (Fig. 3). Clutch VK7 (circuit 6) is then switched over to circuit:

(12) Earth, contact 71 (NS88, N141), contact 31'', contact 37, clutch VK7, minus.

Hence the replying mechanism continues to operate. As subscriber 87 transmits speech impulses relay JA42 (circuit 11) becomes energized. By the energizing of relay JA42, contacts 39, 40 and 41 are closed. The electromagnetic clutch KA8 is energized by circuit:

(13) Earth, contact 39, clutch KA8, minus.

Sound carrier TT170 (Fig. 3) of the recording-cum-reproduction apparatus is now set in motion in the usual manner. Pick-up SA19 is guided in the usual manner by steering disc FS171 (Fig. 3) by way of pick-up carrier SPA173 and the rigidly fixed steering member FA172. The holding of relay AF4 is transferred to time delay-relay JA42 through circuit

(14) Earth, contact 41 relay AF4 (operating coil) minus.

It be now assumed that subscriber T87 did not commence to speak after the first invitation to speak. Hence relay JA42 has not become energized and circuits 13 and 14 have not been made. Once cam disc NS88 cam N141 has opened the two contacts 70 and 71, relay AF4 (circuit 9) becomes dead, and so does circuit 12. The circuit is once again made through circuit 6. The subscriber now hears through circuit 8 the second reply respectively the second invitation to speak. After cam N106 has again closed contacts 70 and 71 circuits 9 and 12 are again energized, and circuit 6 is broken once more. If now the subscriber follows the second invitation to speak the circuits 10, 11, 13 and 14 will become energized as a result of the sounds produced by his speech. Those messages of subscriber T87 are then recorded in the usual manner on sound carrier TT170 (Fig. 3). Clutch VK7 of the replying mechanism remains energized until cam disc NS89 with cam N107 opens contact 72, which means that the running of the replying mechanism, once cam disc NS88 has opened the two contacts 70 and 71, is maintained by circuit.

(15) Earth, contact 40, contact 72 (NS89, N107), contact 31'', contact 37, clutch VK7, minus.

It is known that predetermined sound signals are conveyed to the callers when the recording capacity of the sound carrier TT170 (Fig. 3) has been reached, so as to inform them that no further messages can be received. It is further known, that with certain types of telephonographs no signals are given at all which makes it difficult for the subscriber to ascertain the condition of the telephonograph.

The present apparatus eliminates those disadvantages thereby that, shortly before recording capacity has been reached, for example the words "Attention please, attention please, full capacity reached" are conveyed to the caller. Shortly before the recording capacity of the sound carrier TT170 has been reached, terminating switch ED6 will close its contacts 68, 69 and 109—or open them respectively. Thereby firstly, the replying mechanism is again set in motion by circuit:

(16) Earth, contact 68, contact 72 (NS89, N107), contact 31'', contact 37, clutch VK7, minus.

Furthermore, by the closing of contact 110 of cam disc NS104, cam N111 connects reproduction amplifies W11 in parallel with transformer U3 through circuit:

(17) Earth, transformer U3, contact 108, contact 109, contact 110 (NS104, N111), amplifier W11, contact 56, pick-up SC21, earth.

The caller T87 now hears for example the words, "Attention please, attention please, full capacity reached." When the replying mechanism has returned to its initial position, i. e. when cam discs 88 to 104 have completed one revolution, cam disc NS90 too will have returned to its initial position and cam 110 on disc NS90 will discharge condenser KO112—which had been charged during the forward movement—through circuit:

(18) Condenser-discharge, relay E17, minus.

Relay E17 will now open contact 45 for a short period. Thereby the holding circuit for relay A2 (circuit 5) is interrupted, whereby all "continuously closed" circuits become de-energized.

If subscriber T87 puts in a further call, i. e. if he wishes to pass on a further message to the telephonograph, he will now hear immediately after the invitation to speak, for example, the words: "Attention please, attention please, full capacity reached" since the recording capacity has been fully consumed. After the invitation to speak circuit 9 cannot now be energized, since terminating switch ED6 has closed, or respectively opened its contacts 69, 68 and 109. This message of the replying device cannot become audible through cam disc NS91, cams N115 and 116, so long as terminating switch ED6 has not been operated, which means that pick-up SG21 remains short-circuited so long as terminating switch ED6 has not closed, or respectively opened its contacts. The suppression of this part of the wording can be effected by circuit.

(19) Earth, contact 69 (ED6), contact 74 (NS91, N115 and N116), pick-up SG21, earth.

Circuit 19, in my example, has thus been interrupted and subscriber T87 can now receive the message.

After the words have become audible the replying mechanism carries over to its initial position and thereby suppresses all messages of sound carrier TT151 through circuit:

(20) Earth, contact 68 (ED6), contact 75 (NS92, N117), contact 38, pick-up SG21, earth.

The continued operation of the replying mechanism is then maintained by circuit 6, its termination effected by circuit 18.

As a second example be it assumed that subscriber T87 puts in a call followed by priming for reproduction. The coil is effected as described under circuits 1, 2, 3, 4, 5, 6, 7 and 8. Thus, for example, the caller can, after the general answering formula and hence prior to the invitation to speak, that means when cam disc NS93 by means of cam N113 closes contact 76, effect the priming for reproduction in the manner already known by the use of one or several vowels. Hence—as subscriber T87 transmits a vowel relay JG47 becomes energized through circuit:

(21) Earth, transformer U3, contact 33, contact 76, (NS93, N113), amplifier GA14, relay JG47, minus.

Relay JG47 closes contacts 48 and 49 and firstly energizes relay WG5 through circuit:

(22) Earth, contact 48, relay WG5 (relay coil), minus.

Furthermore contact 49 will, in the usual manner control the impulses, or corresponding vowels, by the secret-combination locking device GE119 not further specified in the present description. If the priming is correct, contact 120 is closed and will energize relay RA23 (priming correct). Had the priming been wrong, contact 121 closes and thereby energizes relay FA24 (priming wrong).

It be assumed that subscriber T87 has effected the correct priming. Relay RA23 is energized for a short period by circuit:

(23) Earth, contact 120 (GE119), relay RA23 operating coil, minus.

The holding of relay RA23 is taken over by circuit:

(24) Earth, contact 81 (NS98, N122), contact 51, relay RA23 holding coil, minus.

The energized relay RA23 with its contact 50 causes pick-up SA19, in the usual manner, to be lifted, for example, from position B into position A (Fig 3), which means, pick-up SA19, pick-up carrier SPA173, and steering member FA172 (Fig. 3) are lifted up by the energizing of the speech release device SAL9. Coil spring F176 serves to pull this device back into position A (starting position). The operating solenoid SAL9 is energized through circuit.

(25) Earth, contact 82 (NS99, N127), contact 50, solenoid SAL9, minus.

Relay WG5 is still held by circuit:

(26) Earth, contact 77 (NS94, N123), contact 35, relay WG5 holding coil, minus.

Prior to cam N123 of cam switch NS94 opening its contact 77, the holding of relay WG5 is transferred to circuit;

(26a) Earth, contact 145, contact 146 (NS98, N122), contact 35, relay WG5 holding coil, minus.

During this operation subscriber T87 receives the words recorded on sound carrier TT151, such as for example "Priming correct" (circuit 8.)

Relay AF4 cannot be energized since relay WG5 is interrupting contact 36. The phrases in Example 1 such as "Attention please, attention please, full capacity reached" would not be audible to the caller due to circuit:

(27) Earth, contact 69 (ED6), contact 74 (NS91, N115) pick-up SG21, earth.

Similarly for example the word "wrong" will not be audible, since the caller has effected the correct priming. Pick-up SG21 will be short-circuited through circuit:

(28) Earth, contact 54, contact 78 (NS95, N134), pick-up SG21, earth.

Now cam switch NS96 with cam N125 will close contact 79 and thus energize relay RW59 by way of circuit:

(29) Earth, contact 52, starting switch AN22, contact 67, contact 79 (NS96, N125), relay RW59, operating coil, minus.

It should be noted that starting switch AN22 has its contact 67 open if no messages are recorded on sound carrier TT170 and that it is closed if such messages do exist. In our second example circuit 29 could thus be made since it was assumed that messages have been recorded on the sound carrier TT170.

Relay RW59 firstly disconnects pick-up SG21 from the amplifier W11 and further connects pick-up SA19 to the latter. Furthermore clutch KA8 is switched on via circuit:

(30) Earth, contact 123, clutch KA8, minus. The sound carrier TT170, steering disc FS171 and gears GT176 (Fig. 3) are coupled in the usual manner to reduction gear RG177 or respectively to motor M18.

Relay RW59, contact 58 connects reproduction amplifier W11 to the reproduction impulse control amplifier WU15 which in the manner already known controls the amplification of the impulses recorded on sound carrier TT170. Relay JW26 is energized through circuit:

(31) Amplifier output W11, contact 58, amplifier WU15, relay JW26, minus. The holding of relay RW59 is transferred to circuit:

(32) Earth, contact 55, contact 57, relay RW59 holding coil, minus. The replying mechanism continues to run, that is so long as contact 86 of cam disc NS103 remains closed. This therefore produces for clutch VK7 circuit:

(33) Earth, contact 86 (NS103, N126), contact 37, clutch VK7, minus. Circuits 24 and 27 become deenergized and hence also circuit 25. Pick-up SA19 is now in the off-position and steering needle FS174 again rests in the steering groove FR178 (Fig. 3). Pick-up carrier SPA173 and steering member FA172 move from A to B. Subscriber T87 hears the messages received in the manner already known by circuit:

(34) Earth, transformer U3, contact 33, amplifier W11, contact 56, contact 34, pick-up SA19, earth.

The replying mechanism, or the clutch VK7 respectively, become de-energized when contact 86 (NS103) is opened. When there are no further recordings on sound carrier TT170 time delay relay JW26 becomes dead (circuit 31). Relay RW59 also becomes dead (circuit 32). Pick-up SA19 (circuit 34) is disconnected from the amplifier W11 and pick-up SG21 is reinserted into the circuit. Clutch VK7 is re-energized through circuit:

(35) Earth, contact 128, contact 37, clutch VK7, minus.

Subscriber T87 is now informed by the replying device e. g. that no further messages have been received. Subscriber T87 is told furthermore that he may issue an order for effacing. At this stage cam disc NS100 by means of cam N129 closes contact 83 and the latter then connects transformer U3 with the effacing amplifier LV16. If the subscriber, for example, transmits a vowel, relay JL66 is energized in the usual manner by circuit:

(36) Earth, transformer U3, contact 33, contact 83, amplifier LV16, relay JL66, minus.

Relay JL66 now initiates the effacing operation. Relay LH64 is energized by circuit:

(37) Earth, contact 65, relay LH64 operating coil, minus, and is then held in by circuit:

(38) Earth, contact 84 (NS101, N130), contact 63, relay LH64 holding coil, minus.

Relay LH64 will, with its contact 62 energize solenoid SAL9 through circuit:

(39) Earth, contact 62, solenoid SAL9, minus.

The pick-up SA19 is lifted, just as in the case of reproduction, from position *St*B to position A and simultaneously clutch KA8 is energized by circuit:

(40) Earth, contact 131, clutch KA8, minus.

Effacing head LK20 effaces in the manner already known all messages recorded on the sound carrier TT170 through circuit:

(41) Earth, contact 60, effacing head LK20, minus.

Whilst those operations are proceeding subscriber T87 receives a message in clear wording that the telephonograph has been effaced. After this message relay WG5 becomes de-energized by the opening of contact 77 (circuit 26).

It should be noted that the word "not" did not become audible to the caller since cam disc NS102 with cam N132 closed contact 85, and hence short-circuited pick-up SG21. This produces circuit:

(42) Earth, contact 61, contact 85, pick-up SG21, earth.

Since relay WG5 has become de-energized the caller receives a further invitation to speak. After that the circuit is once again energized by cam disc NS88 cam 133. The caller will now either follow the invitation to speak or he will not do so. If he does make a recording, the various circuits, referred to in Example 1, will become energized, which means that circuit 9 is in this case made by cam disc N133 with cam 88. The replying device, in this case, stays put and does not start up again until, for example, full recording capacity has been reached, or alternatively until the caller does not emit any further speech impulses, that means until relay JA42 has become de-energized. The replying device then again continues to operate until the discharging of condenser Ko112 excites relay E17 (circuit 18).

As a third example it be assumed that the caller T87 releases the "wrong" priming combination for reproduction, that means, that the vowels emitted in the manner already known do not correspond with the secret combination locking device GE119. Relay RA23 (circuit 23) does not become energized, while, on the other hand, relay FA24 does become energized by circuit:

(43) Earth, contact 121 (secret combination locking device GE119) relay FA24, minus.

The holding-in of relay FA24 is taken over by circuit:

(44) Earth, contact 81 (NS98, N122), contact 53, relay FA24, holding coil, minus.

Since, therefore, relay RW59 (circuit 29) has not been energized pick-up SG21 will not be switched off.

Subscriber T87 now receives the message from the replying device that the priming was wrong. The word "correct" will not be received in this case.

The word "correct" is suppressed by circuit:

(45) Earth, contact 54, contact 80 (NS97, N135) pick-up SG21, earth.

Caller T87 is now given another opportunity to effect a second priming for reproduction. Since relay FA24 has been energized, circuit 26*a* cannot be made. Hence circuit 26 too will become dead, i. e. contact 77 is opened by can N123 of cam disc NS94. Caller T87 thereby receives the answering formula as in Example 2.

This time circuit 21 is initiated by cam N114 of cam NS93. Furthermore circuit 29 is excited by cam N137 of cam NS96. If subscriber T87 does now effect the correct priming, that means, if this time the emitted vowels correspond with the secret combination locking device GE119, the word "wrong" is not produced. Circuit 28, this time, is made by cam N139 of cam disc NS95.

Had the priming once again been effected in the wrong manner the word "correct" would not have been produced. In that case circuit 45 would be effected by means of cam N139 of cam disc NS97.

It is assumed that subscriber T87 has correctly effected the priming for reproduction and that the messages are passed to subscriber T87 through circuit 34; in that case all other circuits will be energized as described in Example 2.

In the end, that means, when there are no further messages left on sound carrier TT170, subscriber T87, as described in Example 2, will be informed, that there are no further messages on sound carrier TT170.

Also he will be given the effacing order through the replying device. If, this time, he does not respond circuits 36, 37, 38, 39, 40 and 41 will not become energized. Nor will circuit 42 be made.

In this case, subscriber T87, through the replying device is told that the recordings, or messages on the sound carrier TT170 have not been effaced ("Not cleared").

Subsequently he receives the invitation to speak which he will either follow or not.

As fourth example to be assumed that subscriber T87 has effected the priming for recording while there are no messages on sound carrier TT170. In this case initiating switch AN22, and hence contact 67 have not been switched over. Thereby, after the energizing of relay RA23 (circuit 23) not relay RW59 (circuit 29) but relay BE147 will be energized by circuit:

(46) Earth, contact 52, contact 67, initiating switch AN22, contact 149, relay BE147, minus.

By the making of circuit 46 subscriber T87 will receive, through the replying device, the information "No messages." This information can be suppressed by circuit:

(47) Earth, contact 150 (NS105, N148), contact 151, pick-up SG21, earth.

The subscriber is now in the position to follow the subsequent invitation to speak or otherwise.

As in all previous cases the switching off will again be effected by condenser discharge (circuit 18).

What I claim as my invention and desire to secure by Letters Patent, is:

1. In combination with a telephonograph, a telephone line, means for connectng a remote caller with said telephonograph, means rendered operative upon establishment of a connection of said caller over said telephone line with said telephonograph to start the operation of the latter, said telephonograph including a sound record and sound reproducing means for reproducing predetermined messages recorded on said sound record in a speaking voice over said telephone line to said caller, said recorded messages being of a nature instructing the caller in two consecutive periods during which words of the same meaning are reproduced to begin to speak the message to be recorded, said sound record containing another message, and means operating said sound reproducing means for reproducing said other message after a predetermined period of time when the recording capacity of the telephonograph has been reached, a second sound record, means for recording a message spoken by said caller on said second sound record, and means for reproducing the message recorded on said second sound record over said telephone line and any extension thereof leading to a remote caller.

2. In combination with a telephonograph, a telephone line, means for connecting a remote caller with said telephonograph, means rendered operative upon establishment of a connection of said caller over said telephone line with said telephonograph to start the operation of the latter, said telephonograph including a sound record and sound reproducing means for reproducing predetermined messages recorded on said sound record in a speaking voice over said telephone line to said caller, said recorded messages being of a nature instructing the caller in two consecutive periods during which words of the same meaning are reproduced to begin to speak the message to be recorded, said sound record containing another message, and means operating said sound reproducing means for reproducing said other message after a predetermined period of time when the recording capacity of the telephonograph has been reached, a second sound record, means for recording a message spoken by said caller on said second sound record, and means for reproducing the message recorded on said second sound record over said telephone line and any extension thereof leading to a remote caller, said last-named sound reproducing means including means rendering said last-named sound reproducing means responsive only to audible sounds of predetermined frequencies produced by a caller connected with said telephonograph, and means causing said last-named sound reproducing means to operate upon receipt of said sounds of predetermined frequencies.

3. In combination with a telephonograph, a telephone line, means for connecting a remote caller with said telephonograph, means rendered operative upon establishment of a connection of said caller over said telephone line with said telephonograph to start the operation of the latter, said telephonograph including a sound record and sound reproducing means for reproducing predetermined messages recorded on said sound record in a speaking voice over said telephone line to said caller, said recorded messages being of a nature instructing the caller in two consecutive periods during which words of the same meaning are reproduced to begin to speak the message to be recorded, said sound record containing another message, and means operating said sound reproducing means for reproducing said other message after a predetermined period of time when the recording capacity of the telephonograph has been reached, a second sound record, means for recording a message spoken by said caller on said second sound record, and means for reproducing the message recorded on said second sound record over said telephone line and any extension thereof leading to a remote caller, said last-named sound reproducing means including means rendering said last-named sound reproducing means responsive only to audible sounds of predetermined frequencies produced by a caller connected with said telephonograph, and means causing said last-named sound reproducing means to operate upon receipt of said sounds of predetermined frequencies, said first-mentioned sound record having recorded thereon still another message, said first-mentioned sound reproducing means being adapted to reproduce said last-named message which informs the caller whether the audible sounds produced by the latter have the correct number of frequencies necessary to start the means for reproducing the message recorded on said second sound record of said telephonograph.

4. In combination with a telephonograph, a telephone line, means for connecting a remote caller with said telephonograph, means rendered operative upon establishment of a connection of said caller over said telephone line with said telephonograph to start the operation of the latter, said telephonograph including a sound record and sound reproducing means for reproducing predetermined messages recorded on said sound record in a speaking voice over said telephone line to said caller, said recorded messages being of a nature instructing the caller in two consecutive messages to start to speak the message to be recorded, a second sound record, means for recording a message on said second sound record, and means for reproducing the recorded message over said telephone line and any extension thereof leading to a remote caller, said first-mentioned sound record having thereon another message which is reproducd by its associated sound reproducing means and transmitted to the caller of said audible sounds to inform the latter whether certain sounds which he is required to produce have the correct number of frequencies necessary to start the reproduction of the message recorded on the second sound record of said telephonograph.

5. In combination with a telephonograph, a telephone line, means for connecting a remote caller with said telephonograph, means rendered operative upon establishment of a connection of said caller over said telephone line with said telephonograph to start the operation of the latter, said telephonograph including a sound record and sound reproducing means for reproducing predetermined mesages recorded on said sound record in a speaking voice over said telephone line to said caller, said recorded messages being of a nature instructing the caller in two consecutive periods during which words of the same meaning are reproduced to begin to speak the message to be recorded, said sound record containing another message, and means operating said sound reproducing means for reproducing said other message after a predetermined period of time when the recording capacity of the telephonograph has been reached, a second sound record, means for recording a message spoken by said caller on said second sound record, and means for reproducing the message recorded on said second sound record over said telephone line and any extension thereof leading to a remote caller, said second sound reproducing means including means responsive only to audible sounds of predetermined frequencies produced by a caller connected with said telephonograph, said last-named means when rendered responsive causing said second sound reproducing means to operate, said first-mentioned sound record having thereon still another mesage which is reproduced by said first-mentioned sound reproducing means and transmitted to the producer of said audible sounds to inform the latter whether said sounds he has produced have the correct number of frequencies necessary to start the reproduction of the message recorded on the second sound record of the telephonograph.

6. In combination with a telephonograph, a telephone line, means for connecting a remote caller with said telephonograph, means rendered operative upon establishment of a connection of said caller over said telephone line with said telephonograph to start the operation of the latter, said telephonograph including a sound record and a sound reproducing means for delivering predetermined messages in the form of audible sound frequency over said telephone line to said caller, said messages instructing the latter when to start to speak the message to be recorded, and including a message informing the caller after a predetermined period of time that the recording capacity of the telephonograph has been reached, and means for reproducing said recorded message over said telephone line and any extension thereof leading to a remote caller, said sound reproducing means including means responsive only to audible sounds of predetermined frequencies produced by a caller connected with said telephonograph, said sound record having thereon another message which is reproduced by said sound reproducing means and transmitted to the caller of said audible sounds to inform the latter whether said sounds have the correct number of frequencies necesary to start the reproduction of the message recorded by said telephonograph, and still another message on said sound record which when reproduced by said sound reproducing means informs the caller that the reproduction of the recorded message is completed.

7. In combination with a telephonograph, a telephone line, means for connecting a remote caller with said telephonograph, means rendered operative upon establishment of a connection of said caller over said telephone line with said telephonograph to start the operation of the latter, said telephonograph including a sound record and a sound reproducing means for delivering predetermined messages in the form of audible sound frequency over said telephone line to said caller, said messages instructing the latter when to start to speak the message to be recorded, and including a message informing the caller after a predetermined period of time that the recording capacity of the telephonograph has been reached, and means for reproducing said recorded message over said telephone line and any extension thereof leading to a remote caller, said sound reproducing means including means responsive only to audible sounds of predetermined frequencies produced by a caller connected with said telephonograph, said sound record having thereon another message which is reproduced by said sound reproducing means and transmitted to the caller of said audible sounds to inform the latter whether said sounds have the correct number of frequencies necessary to start the reproduction of the message recorded by said telephonograph, and still another message on said sound record which when reproduced by said sound reproducing means informs the caller that the reproduction of the recorded message is completed, and means for transmitting to the caller at the completion of the reproduction of the recorded message a spoken invitation to efface the reproduced recorded message.

8. In combination with a telephonograph, a telephone line, means for connecting a remote caller with said telephonograph, means rendered operative upon establishment of a connection of said caller over said telephone line with said telephonograph to start the operation of the latter, said telephonograph including a sound record and a sound reproducing means for delivering predetermined messages in the form of audible sound frequency over said telephone line to said caller, said messages instructing the latter when to start to speak the message to be recorded, and including a message informing the caller after a predetermined period of time that the recording capacity of the telephonograph has been reached, and means for reproducing said recorded message over said telephone line and any extension thereof leading to a remote caller, said sound reproducing means including means responsive only to audible sounds of predetermined frequencies produced by a caller connected with said telephonograph, said sound record having thereon another message which is reproduced by said sound reproducing means and transmitted to the caller of said audible sounds to inform the latter whether said sounds have the correct number of frequencies necessary to start the reproduction of the message recorded by said telephonograph, and still another message on said sound record which when reproduced by said sound reproducing means informs the caller that the reproduction of the recorded message is completed, means for transmitting to the caller at the completion of the reproduction of the recorded message a spoken invitation to efface the reproduced recorded message, and means under the control of the caller having listened to the reproduced recorded message to cause said message to be effaced from the sound record.

9. In combination with a telephonograph, a telephone line, means for connecting a remote caller with said telephonograph, means rendered operative upon establishment of a connection of said caller over said telephone line with said telephonograph to start the operation of the latter, said telephonograph including a sound record and a sound reproducing means for delivering predetermined messages in the form of audible sound frequency over said telephone line to said caller, said messages instructing the latter when to start to speak the message to be recorded, and including a message informing the caller after a predetermined period of time that the recording capacity of the telephonograph has been reached, and means for reproducing said recorded message over said telephone line and any extension thereof leading to a remote caller, said sound reproducing means including means responsive only to audible sounds of predetermined frequencies produced by a caller connected with said telephonograph, said sound record having thereon another message which is reproduced by said sound reproducing means and transmitted to the caller of said audible sounds to inform the latter whether said sounds have the correct number of frequencies necessary to start the reproduction of the message recorded by said telephonograph, and still another message on said sound record which when reproduced by said sound reproducing means informs the caller that the reproduction of the recorded message is completed, means for transmitting to the caller at the completion of the reproduction of the recorded message a spoken invitation to efface the reproduced recorded message, means under the control of the caller having listened to said reproduced message to cause said message to be effaced, and means for transmitting to the caller another message in clearly spoken words informing him whether the reproduced message has been effaced.

MAX HANDSCHIN.

REFERENCES CITED

The following references are of record in the file of this patent:

UNITED STATES PATENTS

| Number | Name | Date |
|---|---|---|
| 1,192,993 | Cressey | Aug. 1, 1916 |
| 1,765,554 | Wensley | June 24, 1930 |
| 1,828,733 | Collins | Oct. 27, 1931 |
| 2,006,455 | Hickman | July 2, 1935 |
| 2,080,812 | Fairbanks | May 18, 1937 |
| 2,261,420 | Shively et al. | Nov. 4, 1941 |
| 2,374,842 | Shively | May 1, 1945 |